(12) United States Patent
Rosano et al.

(10) Patent No.: US 9,773,262 B2
(45) Date of Patent: Sep. 26, 2017

(54) INTEGRATED FILE STRUCTURE USEFUL IN CONNECTION WITH APPARATUS AND METHOD FOR FACILITATING ACCOUNT RESTRUCTURING IN AN ELECTRONIC BILL PAYMENT SYSTEM

(75) Inventors: Sharon A. Rosano, New Canaan, CT (US); Bryan-Earl Kerola, Salinas, CA (US); Pauline Ow, Chesterfield, MO (US); Darlene M. Lohman, Bartelso, IL (US)

(73) Assignee: MASTERCARD INTERNATIONAL INCORPORATED PURCHASENY (US)

( * ) Notice: Subject to any disclaimer, the term of this patent is extended or adjusted under 35 U.S.C. 154(b) by 1148 days.

(21) Appl. No.: 12/617,071

(22) Filed: Nov. 12, 2009

(65) Prior Publication Data

US 2010/0174644 A1   Jul. 8, 2010

Related U.S. Application Data

(63) Continuation-in-part of application No. 11/829,988, filed on Jul. 30, 2007, now Pat. No. 7,917,435.
(Continued)

(51) Int. Cl.
*G06Q 30/04* (2012.01)
*G06Q 20/10* (2012.01)
(Continued)

(52) U.S. Cl.
CPC .......... *G06Q 30/04* (2013.01); *G06Q 20/102* (2013.01); *G06Q 20/14* (2013.01); *G06Q 40/12* (2013.12)

(58) Field of Classification Search
CPC .......................... G06F 17/30076; G06C 20/14
See application file for complete search history.

(56) References Cited

U.S. PATENT DOCUMENTS 5,913,202 A    6/1999  Motoyama
6,070,150 A *  5/2000  Remington et al. ............ 705/34
(Continued)

FOREIGN PATENT DOCUMENTS

JP             08055217 A  *  2/1996   ............... G06T 7/00

OTHER PUBLICATIONS

Analytics and the Data Warehouse; by John Hallick p. 3; Jun. 2001.*

(Continued)

*Primary Examiner* — Mohammad Z Shaikh
*Assistant Examiner* — Mary Gregg
(74) *Attorney, Agent, or Firm* — Otterstedt, Ellenbogen & Kammer, LLP

(57) ABSTRACT

An electronic funds transfer bill payment operation of a financial institution receives first information, representing an account restructuring of a biller which uses the bill payment operation, which information is combined with second information, which is formatted differently than the first information, into a uniformly formatted file. The second information includes card update information for recurring payment card payments made with payment cards issued by the financial institution. The uniformly formatted file is transferred to an operator of a payment network of a kind configured to facilitate transactions between multiple issuers and multiple acquirers, and it specifies at least one old account number associated with a biller and at least one new account number associated with the biller. The payment network operator operates both a recurring payment transaction system for card-not-present recurring payments and an electronic funds transfer account conversion application in accordance with the uniformly formatted file.

24 Claims, 11 Drawing Sheets

Related U.S. Application Data

(60) Provisional application No. 60/838,523, filed on Aug. 17, 2006, provisional application No. 61/114,508, filed on Nov. 14, 2008.

(51) Int. Cl.
*G06Q 20/14* (2012.01)
*G06Q 40/00* (2012.01)

(56) References Cited

U.S. PATENT DOCUMENTS

| | | |
|---|---|---|
| 7,080,035 B1 | 7/2006 | Williams et al. |
| 7,246,226 B1 | 7/2007 | Bowers |
| 2002/0007343 A1 | 1/2002 | Oyama |
| 2003/0225688 A1 | 12/2003 | Dobbins |
| 2004/0044665 A1* | 3/2004 | Nwabueze ............. 707/9 |
| 2004/0050928 A1* | 3/2004 | Bishop et al. ......... 235/380 |
| 2004/0143527 A1* | 7/2004 | Benkert et al. ........ 705/35 |
| 2005/0021456 A1 | 1/2005 | Steele |
| 2005/0197957 A1* | 9/2005 | Keith et al. ........... 705/40 |
| 2006/0106694 A1 | 5/2006 | Carlson et al. |
| 2006/0116949 A1 | 6/2006 | Wehunt |
| 2006/0190374 A1 | 8/2006 | Sher |
| 2006/0235899 A1 | 10/2006 | Tucker |
| 2007/0050291 A1* | 3/2007 | Avazian et al. ........ 705/42 |
| 2007/0271603 A1 | 11/2007 | Lee |
| 2008/0046364 A1 | 2/2008 | Hall |
| 2008/0065520 A1 | 3/2008 | Hazlehurst et al. |
| 2009/0171839 A1 | 7/2009 | Rosano |

OTHER PUBLICATIONS

"MasterCard Payment Gateway, e-P3." downloaded from http://www.mastercard.com/us/business/en/corporate/purchasingsolutions/integration/ep3/paymentgateway.html.

"Mastercard Remote Payment and Presentment Services." downloaded from https://www.mastercardintl.com/rpps/.

Chemical's Promise, American Banker, SourceMedia Inc. HighBeam Research Jan. 2, 2010 <http://www.highbeam.com>.

Halifax Savings Account: Money Matters, Diana Wright, Jul. 16, 2000,Halifax Group PLC, The Sunday Times Guide to Personal Finance at money.matters@sunday-times.co.uk.

Street Talk: Merrill Creates Low Expectations for New Asset Account, by Jed Howitz: On Wall Street, Aug. 1, 1999, Thomson Media.

\* cited by examiner

FIG. 3

CURRENT ABU FILE FORMAT:

ISSUER ACCOUNT CHANGE DATA FILE HEADER RECORD

| NO. | FIELD NAME | LENGTH | TYPE | POSITION | DESCRIPTION |
|---|---|---|---|---|---|
| 1 | HEADER IDENTIFIER | 1 | AN | 1 | VALUE H |
| 2 | ISSUER MEMBER ID/ICA NUMBER | 11 | N | 2-12 | ISSUER'S MEMBER ID/ICA NUMBER:<br>- MUST BE NUMERIC<br>- ALREADY MUST EXIST ON CURRENT MasterCard MEMBER ID ACTIVE ISSUER LIST, MAINTAINED BY MasterCard |
| 3 | FILLER | 58 | AN | 13-70 | SPACES |

FIG. 4A

DETAIL RECORD FOR ISSUER ACCOUNT CHANGE FILE

| NO. | FIELD NAME | LENGTH | TYPE | POSITION | DESCRIPTION |
|---|---|---|---|---|---|
| 1 | DETAIL IDENTIFIER | 1 | AN | 1 | VALUE D |
| 2 | ISSUER IDENTIFIER | 11 | N | 2-12 | ISSUER'S MasterCard MEMBER ID/ICA NUMBER MUST:<br>- BE NUMERIC<br>- ALREADY EXIST ON THE CURRENT MasterCard MEMBER ID ACTIVE ISSUER LIST, MAINTAINED BY MasterCard |
| 3 | OLD ACCOUNT NUMBER | 19 | AN | 13-31 | ORIGINAL ACCOUNT NUMBER:<br>- MUST BE FORMATTED AS LEFT-JUSTIFIED, SPACE-FILLED TO THE RIGHT<br>- MUST BE 13-19 POSITIONS<br>- MUST BE NUMERIC WITH NO EMBEDDED SPACES<br>- IS REQUIRED FOR ALL UPDATES, INCLUDING CLOSED (C) AND OVERRIDE FOR DELETION (O) ACCOUNTS |
| 4 | OLD EXPIRATION DATE | 4 | N | 32-35 | ORIGINAL EXPIRATION DATE MUST BE NUMERIC, AND IN MMYY FORMAT |
| 5 | NEW ACCOUNT NUMBER | 19 | AN | 36-54 | NEW ACCOUNT NUMBER MUST:<br>- BE LEFT-JUSTIFIED, SPACE FILLED TO THE RIGHT<br>- BE 13-19 POSITIONS<br>- BE NUMERIC WITH NO EMBEDDED SPACES<br>- NOT BE USED FOR OVERRIDE FOR DELETION (O) AND CLOSED (C) ACCOUNTS<br>- PASS IC/BIN VALIDATION RULES |
| 6 | NEW EXPIRATION DATE | 4 | N | 55-58 | NEW EXPIRATION DATE MUST:<br>- BE NUMERIC AND IN MMYY FORMAT<br>- NOT BE USED FOR OVERRIDE FOR DELETION (O) AND CLOSED (C) ACCOUNTS (CONSTANT ZEROS) |

FIG. 4B

| NO. | FIELD NAME | LENGTH | TYPE | POSITION | DESCRIPTION |
|---|---|---|---|---|---|
| 7 | REASON CODE | 1 | AN | 59 | VALID REASON CODES ARE:<br>- C-CLOSED ACCOUNT<br>- E-EXPIRATION DATE UPDATE<br>- P-MasterCard-TO-MasterCard PORTFOLIO UPGRADE<br>- B-BRAND "FLIP" TO MasterCard<br>- R-REPLACEMENT CARD<br>- O-OVERRRIDE FOR DELETION<br>- X-UPDATES TO NEW ACCOUNTS<br>- Y-UPDATES TO OLD ACCOUNTS |
| 8 | FILLER | 11 | AN | 60-70 | SPACES |

FIG. 5A

CURRENT RPPS FILE FORMAT:
CUSTOMER PORTFOLIO CONVERSION FILE LAYOUT:
FILE HEADER RECORD

| FIELD NUMBER | NAME | LENGTH | TYPE | POSITION | DESCRIPTION |
|---|---|---|---|---|---|
| 1 | HEADER IDENTIFIER | 1 | AN | 1 | VALUE 'H' |
| 2 | CONCENTRATOR ID | 8 | N | 2-9 | CONCENTRATOR REGISTERED ID WITH RPPS<br>- MUST BE NUMERIC<br>- MUST BE VALID PARTICIPANT ID |
| 3 | DATE | 8 | N | 10-17 | FORMAT: MMDDYYYY<br>- MUST BE NUMERIC |
| 4 | FILLER | 63 | AN | 18-80 | SPACES |

DETAIL RECORD

| FIELD NUMBER | NAME | LENGTH | TYPE | POSITION | DESCRIPTION |
|---|---|---|---|---|---|
| 1 | DETAIL IDENTIFIER | 1 | AN | 1 | VALUE 'D' |
| 2 | OLD BILLER ID | 10 | N | 2-11 | BILLER REGISTERED ID WITH RPPS<br>- MUST BE NUMERIC<br>- MUST ALREADY EXIST ON CURRENT RPPS MERCHANT TABLE |
| 3 | OLD CONSUMER ACCOUNT NUMBER | 22 | AN | 12-33 | CANNOT BE BLANK. LEFT JUSTIFIED. EXACT ACCOUNT NUMBER IS EXPECTED.<br>e.g. IF THE ACTUAL ACCOUNT NUMBER IS 10 BYTES WITH LEADING ZEROES; THE LEADING ZEROES MUST BE INCLUDED.<br>e.g. 0001234567 SHOULD BE PUT IN THIS FIELD INSTEAD OF 1234567. |
| 4 | NEW BILLER ID | 10 | N | 34-43 | BILLER REGISTERED ID WITH RPPS<br>- MUST BE NUMERIC<br>- MUST BE THE EXACT SAME NUMBER AS REGISTERED IN RPPS |

FIG. 5B

| 5 | NEW CONSUMER ACCOUNT NUMBER | 22 | AN | 44-65 | CANNOT BE BLANK. LEFT JUSTIFIED. EXACT ACCOUNT NUMBER IS EXPECTED. e.g. IF THE ACTUAL ACCOUNT NUMBER IS 10 BYTES WITH LEADING ZEROES; THE LEADING ZEROES MUST BE INCLUDED. e.g. 0001234567 SHOULD BE PUT IN THIS FIELD INSTEAD OF 1234567. |
|---|---|---|---|---|---|
| 6 | REASON CHANGE CODE | 1 | AN | 66 | VALID VALUES: 'A' - ADD 'C' - CHANGE 'D' - DELETE |
| 7 | FILLER | 14 | AN | 67-80 | SPACES |

TRAILER RECORD

| FIELD NUMBER | NAME | LENGTH | TYPE | POSITION | DESCRIPTION |
|---|---|---|---|---|---|
| 1 | TRAILER IDENTIFIER | 1 | AN | 1 | VALUE 'T' |
| 2 | CONCENTRATOR ID | 8 | N | 2-9 | CONCENTRATOR REGISTERED ID WITH RPPS<br>- MUST BE NUMERIC<br>- MUST BE VALID PARTICIPANT ID<br>- MUST MATCH THE CONCENTRATOR ID ON THE HEADER RECORD |
| 3 | RECORD COUNT | 10 | N | 10-19 | TOTAL NUMBER OF RECORDS IN THE FILE FOR THE CONCENTRATOR ID. THIS INCLUDES HEADER AND TRAILER RECORD.<br>- MUST BE NUMERIC<br>- LEADING ZEROS WITH RIGHT JUSTIFIED |
| 4 | FILLER | 61 | AN | 20-80 | SPACES |

FIG. 7

COMBINED ACCOUNT CONVERSION AND ABU FILE FORMAT DATA ELEMENTS

```
BATCH FILE HEADER RECORD
  - HEADER IDENTIFIER                              AN
  - IDENTIFICATION NUMBER (MEMBER/CONCENTRATOR ID) N
  - DATE                                           N   (MMDDYYYY)
  - FILLER                                         AN

DETAIL RECORD
  - DETAIL IDENTIFIER                              AN
  - ISSUER IDENTIFIER (MEMBER ID/ICA)              N
  - OLD BILLER ID                                  N
  - OLD ACCOUNT NUMBER                             AN
  - OLD EXPIRATION DATE                            N   (MMYY)
  - NEW BILLER ID                                  N
  - NEW ACCOUNT NUMBER                             AN
  - NEW EXPIRATION DATE                            N   (MMYY)
  - REASON CODE                                    AN
  - FILLER                                         AN

TRAILER RECORD
  - TRAILER IDENTIFIER                             AN
  - MEMBER/CONCENTRATOR ID                         N
  - RECORD COUNT                                   N
  - FILLER                                         AN

N  = NUMBERIC
AN = ALPHA NUMERIC
```

US 9,773,262 B2

INTEGRATED FILE STRUCTURE USEFUL IN CONNECTION WITH APPARATUS AND METHOD FOR FACILITATING ACCOUNT RESTRUCTURING IN AN ELECTRONIC BILL PAYMENT SYSTEM

CROSS-REFERENCE TO RELATED APPLICATIONS

This patent application is a continuation-in-part of U.S. patent application Ser. No. 11/829,988 filed Jul. 30, 2007 now U.S. Pat. No. 7,917,435, now published as US Patent Publication 2008-0046364 on Feb. 21, 2008, which claims the benefit of U.S. Provisional Patent Application Ser. No. 60/838,523 filed on Aug. 17, 2006 and entitled "Apparatus and Method for Facilitating Account Restructuring in an Electronic Bill Payment System." This patent application also claims the benefit of U.S. Provisional Patent Application Ser. No. 61/114,508 filed on Nov. 14, 2008 and entitled "Integrated File Structure Useful in Connection With Apparatus and Method for Facilitating Account Restructuring in an Electronic Bill Payment System." The disclosures of the aforementioned Provisional Patent Application Ser. Nos. 60/838,523 and 61/114,508 and the aforementioned U.S. patent application Ser. No. 11/829,988, now published as US Patent Publication 2008-0046364, are expressly incorporated herein by reference in their entirety for all purposes.

FIELD OF THE INVENTION

The present invention relates generally to the electronic and computer arts, and, more particularly, to apparatus and methods for electronic payments.

BACKGROUND OF THE INVENTION

Electronic bill presentment and payment is widely used. Portfolios of accounts may need to be converted to new account numbers or structures. Currently, such conversion is typically handled outside of the electronic bill payment system. Balers may develop proprietary solutions requiring manual research and posting of payments, resulting in delay, expense, and potential errors.

Parties using electronic payment systems, such as on-line bill paying, may not always review paper statements or notices received from billers, and thus may not update the biller account when changes occur, causing payments to fail. Such payments may become unpostable, received by the wrong party, or rejected by the system.

SUMMARY OF THE INVENTION

Principles of the present invention provide techniques for an integrated file structure useful in connection with an apparatus and method for facilitating account restructuring in an electronic bill payment system.

An exemplary embodiment of a method (which can be computer-implemented), according to one aspect of the invention, includes the steps of receiving, at an electronic funds transfer bill payment operation of a financial institution, first information representing an account restructuring of a biller which uses the electronic funds transfer bill payment operation; and combining the first information with second information into a uniformly formatted file. The second information is formatted differently than the first information. The second information comprises card update information for recurring payment card payments made with payment cards issued by the financial institution. A further step includes transferring the uniformly formatted file to an operator of a payment network of a kind configured to facilitate transactions between multiple issuers and multiple acquirers.

In another aspect, an exemplary embodiment of an apparatus includes a first memory and at least a first processor coupled to the first memory. The at least first processor is operative to carry out method steps as just described. Preferably, the apparatus further includes a payment network of the kind configured to facilitate transactions between multiple issuers and multiple acquirers. The payment network is operated by the operator and is coupled to the at least first processor. Preferably, the apparatus further includes a second memory and at least a second processor coupled to the second memory and the payment network. The at least second processor is operative to receive the uniformly formatted file. The uniformly formatted file specifies at least one old account number associated with the biller and at least one new account number associated with the biller. The at least second processor is operative to operate a recurring payment transaction system for card-not-present recurring payments in accordance with the uniformly formatted file, by updating card information for the card-not-present recurring payments in accordance with the uniformly formatted file; and to operate an electronic funds transfer account conversion application in accordance with the uniformly formatted file, by routing payments in accordance with the uniformly formatted file.

Furthermore, an exemplary embodiment of a method (which can be computer-implemented), according to yet another aspect of the invention, includes the step of receiving, by an operator of a payment network of a kind configured to facilitate transactions between multiple issuers and multiple acquirers, from a financial institution, a uniformly formatted file as discussed above. The uniformly formatted file specifies at least one old account number associated with a biller and at least one new account number associated with the biller. Further steps include operating a recurring payment transaction system for card-not-present recurring payments, by the operator of the payment network, in accordance with the uniformly formatted file, by updating card information for the card-not-present recurring payments in accordance with the uniformly formatted file; and operating an electronic funds transfer account conversion application, by the operator of the payment network, in accordance with the uniformly formatted file, by routing payments in accordance with the uniformly formatted file.

Aspects of the invention contemplate the method(s) performed by one or more entities herein, as well as facilitating (as defined below) of one or more method steps by the same or different entities.

One or more embodiments of the invention or elements thereof can be implemented in the form of a computer program product including a tangible computer readable recordable storage medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules;

any of (i)-(iii) implement the specific techniques set forth herein, and the software modules are stored in a tangible computer-readable recordable storage medium (or multiple such media).

One or more embodiments of the invention can provide substantial beneficial technical effects, for example, more efficient use of network resources.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

These and other features and advantages of the invention will become apparent from the following detailed description of illustrative embodiments thereof, which is to be read in connection with the accompanying drawings.

BRIEF DESCRIPTION OF THE DRAWINGS

FIG. 3 is an example of an issuer account change data file header record in a current ABU file format;

FIGS. 4A and 4B present an example of a detail record for an issuer account change file;

FIGS. 5A and 5B present a current RPPS file format for a customer portfolio conversion file layout;

FIG. 7 presents an exemplary list of data elements for such a combined account conversion and ABU file, according to an aspect of the invention;

DETAILED DESCRIPTION OF PREFERRED EMBODIMENTS

Figure 1:
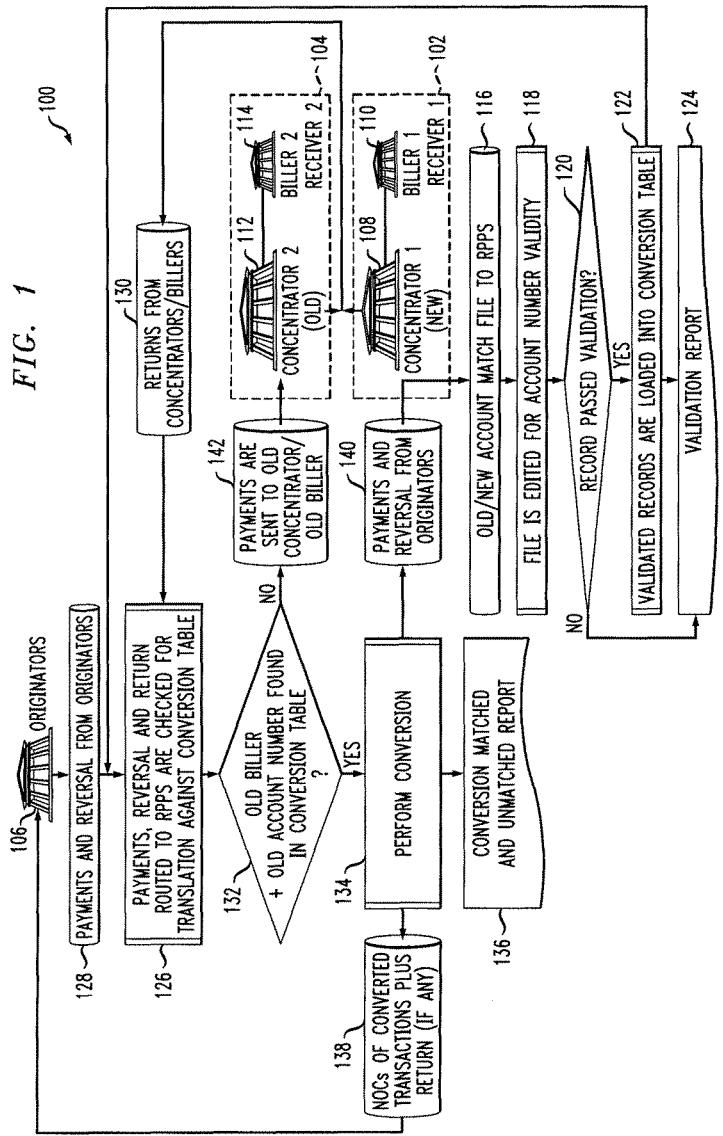
FIG. 1 shows a flow chart exemplary of techniques for account restructuring.

Attention should now be given to FIG. 1, which depicts a flow chart 100 of exemplary method steps in a method for facilitating account restructuring in an electronic bill payment system, according to an aspect of the invention. The system can have a plurality of participating entities including a plurality of receivers 102, 104 (only two are shown for purposes of illustrative convenience) and a plurality of originators 106 (shown as a single block for illustrative convenience). The receivers can include concentrators and/or billers. Thus, by way of example and not limitation, the first receiver 102 can include concentrator 108 and biller 110, while the second receiver 104 can include concentrator 112 and biller 114. It will be appreciated that the billers 110, 114 can be under different concentrators 108, 112 as shown, or could both be under the same concentrator. Billers 110, 114 may each have a biller identifier (biller ID). Translation techniques described herein can be carried out, e.g., from one biller ID to many biller IDs, or from many biller IDs to one biller ID, or in any desired combination.

The method can include the step 116 of obtaining a data file indicative of an account restructuring of a given one of the receivers 102. The data file specifies at least one old account number associated with the receiver and at least one new account number associated with the receiver (there could be, for example, more than one new account number associated with the receiver). The method can also include placing the old and new account numbers of the receiver in a conversion data structure in a format to facilitate account number conversion, as at step 122 (the data structure can be, for example, a conversion table). Further, the method can include obtaining remittance data 128, 130 from a given one of the participating entities. The remittance data can include, for example, payments and/or reversals from one or more originators, as at block 128. The remittance data can also include, in addition to or in lieu of the payments and/or reversals, returns from receivers, as at block 130. The remittance data typically includes an indication of the old account number of the receiver or the new account number of the receiver. That is, payments or reversals from an originator might include the old account number that needed to be converted to the new account number, while returns from receivers might include the new account number that had already been converted and needed to be converted back to avoid confusing the originator.

The method can also include the step of routing the remittance data in accordance with the old or new account number of the receiver, as the case may be: and the data structure. One manner of routing is depicted in blocks 126, 132, 134, 138, and 140, to be discussed more fully below. The remittance data can potentially be routed to more than one destination. The routing step can include routing the payment and/or reversal to a single new account number associated with the receiver, which could be, for example, a new account of the receiver, or a number of an account of a third party, e.g., an assignee of the accounts receivable of the original receiver. As noted, in addition to account number information, remittance data can include identification data such as a biller ID (broadly understood to encompass identification of a biller or concentrator). The aforementioned data file can specify a new destination receiver identification identifying the third party, such as a new biller ID identifying the assignee.

Where, for example, a single biller portfolio is sold to multiple billers, the data file can specify a plurality of new account numbers associated with the old account number of the receiver, and the routing step can include routing the remittance data in accordance with the plurality of new account numbers associated with the old account number of the receiver. Rules can be provided to determine where a given payment, reversal, or return goes. For example, suppose First Bank of Smithtown sells its portfolio to Acme Bank and Baker Bank. Some subset of the old accounts could be assigned to Acme Bank and another set to Baker Bank, based on account numbers or some other criteria. For example, some range of old account numbers could go to a first one of the new accounts (associated with Acme Bank) and another to a second of the new accounts associated with Baker Bank).

Thus, in the case of a payment and/or a reversal from a given one of the originators, the routing step could include routing the payment or reversal, as the case may be, in accordance with the plurality of new account numbers associated with the old account number of the receiver, by routing the payment or reversal to a first one of the plurality of new account numbers if the payment or reversal satisfies first account number criteria and to a second one of the plurality of new account numbers if the payment or reversal satisfies second account number criteria. Again, the account number criteria could be ranges of account numbers, including portions of account numbers, account masks, some type of formula, and the like.

Optionally, the method can include the additional step of checking the data file, for example, by carrying out steps 118 and 120. Step 118 can include, for example, running a check digit routine against the old and new account numbers, and/or verifying account masks for the old and new account numbers. Step 120 can include determining whether the data filed passed the check digit routine and the verifying account masks step. In another optional step 124, a validation report can be generated. Such report could be maintained in house by an entity performing the conversion, or could be given to the receiver automatically or upon request of the receiver. Step 124 can be conducted if a record from a data file fails validation, as shown at the "NO" branch of decision block 120, and if desired, can also be performed if the record passes validation, as shown by the side arrow from block 122.

As shown at block 138, the method can also include the additional step of preparing a notice of change of a converted transaction for the originator. As will be discussed further herein, the notice of change can be sent to the originator, as can returns from receivers. The notice of change can be sent, e.g., in the form of a transaction, to alert the originator to the account number change, and can include, e.g., the original payment data, new account number, and destination biller ID if applicable.

Further details will now be provided regarding the aforementioned routing step, which can include, for example, checking the remittance data, as at 126 to determine, as at 132, whether the old account number of the receiver or the new account number of the receiver, as the case may be, is contained in the data structure. Further, routing can include performing conversion as at block 134. This can include, e.g., identifying the payment remittance data as destined for the new account number of the receiver (where remittance data has old number) or the old account number of the receiver (where remittance data has new number), responsive to the old account number of the receiver being contained in the data structure in association with the new account number of the receiver, or the new account number of the receiver being contained in the data structure in association with the old account number of the receiver. By way of explanation, for a payment and/or reversal 128 from an originator, the old account number could be converted to the new account number, with routing to the correct receiver account as at block 140, while for a return 130 from a receiver, the new account number could be converted back to the old account number for routing back to the originator as at block 138, to avoid confusing the originator when the return is received. Note that if the old biller ID and old account number are not found in the table, as at the "N" branch of block 132, the payment and/or reversal is simply sent to the usual ("old") receiver as at block 142. Similarly, returns with no conversion data in the table can simply be processed in the usual way.

As shown at block 136, an additional optional step can include preparing a conversion matched and unmatched report, based on steps such as 132 and/or 134. Such report can summarize what has and has not been converted, and if desired, can be sent to corresponding appropriate parties. The report can track payments converted and rerouted. Appropriate parties to receive the report can include billers with converting portfolios, affected originators, and the entity maintaining the system. Billers could use the data to contact entities using the wrong account number.

Another optional method step can include repeating the step 116 of obtaining the data file, the step 122 of placing the file in the structure, the step 126 of obtaining remittance data, and the step (e.g., 132, 134, 138, 140) of routing the data, for at least a second data file indicative of an account restructuring of at least another given one of the receivers (for example, when several receivers (say 102 and 104) are restructuring). In another aspect, one could repeat the step 126 of obtaining remittance data and the step (e.g., 132, 134, 138, 140) of routing the data, for at least second remittance data from at least another given one of the originators (for example, where multiple originators are still using the old account number).

If desired, the method steps can be carried out indefinitely, until a stop request is obtained from the given receiver.

By way of further discussion of a "return" scenario, in such case, the given one of the participating entities is a given one of the receivers 102, 104, and the remittance data is a return 130 of a prior payment from a given one of the originators 106 to the given one of the receivers. The prior payment has been converted from the old account number of the given one of the receivers to the new account number of the given one of the receivers, and the return includes an indication of the new account number of the given one of the receivers. The routing step in this case can include converting the indication of the new account number of the given one of the receivers to an indication of the old account number of the given one of the receivers, so that the party receiving the return is not confused by receiving the return with an account number they are not familiar with. Routing, as used herein, including the claims, is to be broadly understood to encompass the cases of payments and/or reversals from an originator, and returns from a receiver.

In another aspect, a method for facilitating account restructuring in an electronic bill payment system of the kind described can include obtaining a data file, as at 116, indicative of an account restructuring of a given one of the receivers 102. The data file specifies at least one first account number criteria, such as a range, associated with the receiver and at least one second account number criteria, such as another range, associated with the receiver. The first and second account number criteria of the receiver can be placed in a conversion data structure as at 122, in a format to facilitate account restructuring. Remittance data 128 can be obtained from a given one of the originators, and the remittance data can include an indication of an account number associated with the receiver. The remittance data can be routed to the receiver if the indication of the account number satisfies the first account number criteria, and the remittance data can be routed back to the given one of the originators if the indication of the account number satisfies the second account number criteria. Such a process can be viewed as a reversal and/or deconversion stop file process, and could be implemented, for example, when a receiver only wishes to be paid for some accounts and wishes to reject payments for other accounts. This might occur where a receiver has retained some accounts and assigned others to a different entity. The process is similar to the first process discussed, except that one would have a data structure showing what to accept and what to return. This could be conducted in lieu of or addition to the routing to old and new account numbers.

Inventive techniques can be employed with any type of electronic bill payment system. In one or more embodiments, inventive techniques can be employed with the MASTERCARD RPPS® electronic payment system of MasterCard International Incorporated of Purchase, N.Y., USA. Techniques of the invention can permit, for example, efficient handling of payment routing and posting challenges inherent in full and partial portfolio conversions. Billers may include, e.g., card issuers, telecommunications companies, and utilities. They may have to reissue customer account numbers due to portfolio splits, account transitions due to mergers and acquisitions, card portfolio flips, and the like. One or more embodiments may permit identification of payments requiring account number conversion, conversion of payments to new account numbers, and re-routing of payments from one biller ID to another.

Further, one or more inventive embodiments allow accurate posting without impact to billers; and billers, bill payment originators, and bill payers can obtain timely delivery and posting of payments without interruption. It will be appreciated that the data structure mentioned above can store, e.g., conversion data to convert between old and new account numbers. Further, rerouting data can also be stored, for example, to direct a translated payment to a new biller ID when all or part of one biller's portfolio has been sold to another. Account number masks or ranges can also be maintained, for example, when routing in a "one to many" scenario. The data structure can include data from a number of entities. Processing can be carried out in a batch or real-time mode, as desired.

In another aspect, embodiments of the invention provide an integrated issuer bulk file for programs such as the MasterCard® Automatic Billing Updater (ABU) & MasterCard® Remote Presentment and Payment (RPPS) programs. Currently both the MasterCard Automatic Billing Updater and the MasterCard RPPS Account Conversion service require issuers and/or billers to submit separate bulk files to report account change information. Aspects of the invention integrate the required data elements of both programs into a new bulk file. Embodiments of the invention may, for example, provide issuers with a streamlined approach to participate in both programs and/or provide operational efficiencies. It is to be emphasized that mention in the text or figures of the MasterCard® Automatic Billing Updater (ABU) program is intended as one non-limiting specific example of a recurring payment transaction system (e.g., for card-not-present recurring payments). Furthermore, it is to be emphasized that mention in the text or figures of the MasterCard® Remote Presentment and Payment (RPPS) program is intended as one non-limiting specific example of an electronic funds transfer account conversion application.

Embodiments of the invention allow for an integrated solution with a single customer data file that contains data elements to populate both the ABU and Account Conversion databases. This enables an efficient change management process for outbound recurring card payment authorizations and electronic funds transfer (EFT) payment transactions with participating Acquirers and Merchants.

The MasterCard Automatic Billing Updater (ABU) program requires issuers to have established endpoints to submit and receive bulk files. Issuers or their issuer processors create and submit the "Issuer Account Change Data File" to report account changes to the MasterCard ABU program. It will be appreciated that, in general terms, as noted, the MasterCard ABU program is a non-limiting example of a system and method for processing recurring payment transactions, as described, for example, in US Patent Publication 2009/0171839 of Rosano et al. entitled "Systems and methods for processing recurring payment transactions," the complete disclosure of which is expressly incorporated by reference herein for all purposes. FIG. 3 is an example of an issuer account change data file header record in a current ABU file format. FIGS. 4A and 4B present an example of a detail record for an issuer account change file.

The RPPS Account Conversion application offers a comprehensive solution to effectively manage each phase of the electronic bill payment lifecycle when Billers must reissue account numbers, while ensuring no interruption to the timely delivery and posting of their customers' electronic bill payments. It will be appreciated that, in general terms, as noted, the RPPS Account Conversion application is a non-limiting example of an electronic funds transfer account conversion application, such as one using techniques as described with regard to FIG. 1 herein.

The application stores the Biller's account number translation data representing the old and new account numbers for their customers as well as any rerouting data needed to direct a translated payment to a new destination Biller. The application maintains criteria necessary to determine which inbound electronic bill payments are candidates for account number translation and rerouting to the new Biller. When a Bill Payment Originator submits an electronic bill payment identified as a candidate for account number translation, the application references the database of old account and new account data and conversion criteria. If the payment account number is found in the database, the application translates the account number to the correct new account number and batches and routes the translated payment to the proper destination Biller.

The application generates a Notification of Change (NOC) transaction in response to the Bill Payment Originator for each payment translated and rerouted to alert the Originator to the account number change event, providing detailed new account and routing information to be used to update their customers' bill payment parameters.

The service continues to correct electronic payments received with old account numbers through an end date mutually agreed upon by the Biller and RPPS. FIGS. 5A and 5B present a current RPPS file format for a customer portfolio conversion file layout.

Figure 6:
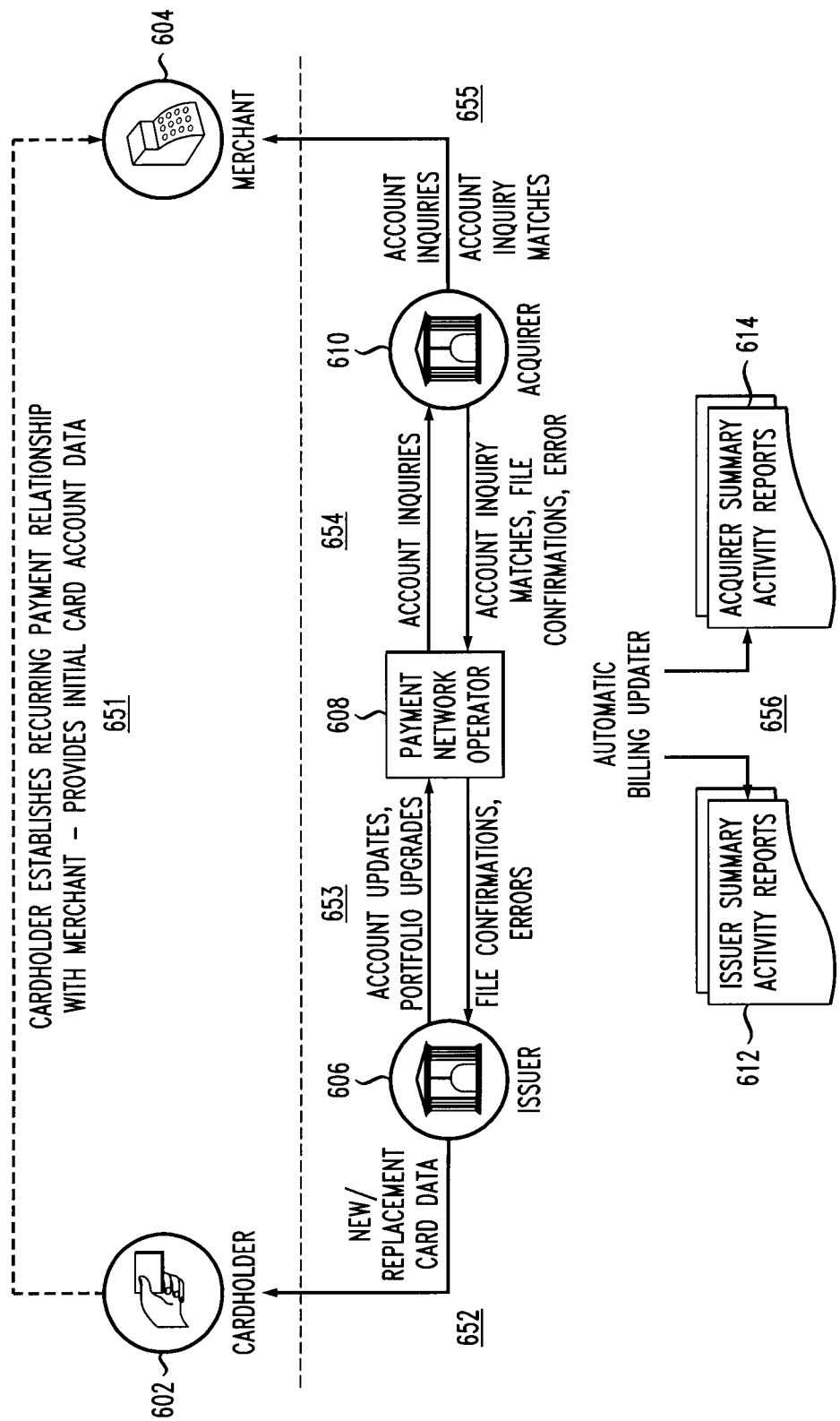
FIG. 6 shows an exemplary automatic biller update (ABU) process.

With regard to the aforementioned ABU, note that, for card-on-file billing, as may be used, for example by consumers and/or merchants, on-file card information may "go stale." The aforementioned ABU provides a stand-alone database which allows issuers to send in a file, to an operator of a payment network 208, 608, 802 (discussed elsewhere herein), with changes to account numbers and/or expiration dates. Such inbound issuer records may be maintained, for example, for a rolling time period such as, for example, thirteen months. Enrolled merchants, and/or their acquirers, are advised of the new data. With reference to FIG. 6, in a first step 651, a cardholder 602 establishes a recurring payment relationship with a merchant 604. In a second step 652, the issuer 606 provides a new or replacement card to holder 602, implying a change in account number and/or expiration date. In a third step 653, issuer 606 provides the aforementioned file to payment network operator 608, indicative of account changes due to, for example, account updates and/or portfolio upgrades. A suitable response with confirmations and/or error indications can be returned from operator 608 to issuer 606. In a fourth step 654, updated data is provided by operator 608 to acquirer 610; for example, in connection with account inquiries; with a suitable response including inquiry matches, confirmations and/or error indications. In a fifth step 655, acquirer 610 passes the account inquiries to merchant 604 with returned inquiry matches. In a sixth step 656, operator 608 prepares issuer summary activity reports 612 and acquirer summary activity reports 614. Of course, in some instances, the steps may be carried out in other appropriate sequences.

Note that references to "MasterCard" in all embodiments are non-limiting examples of the aforementioned operator of a payment network 208, 608, 802, operating according to a payment standard and/or specification. Examples of the payment network include those of the kind configured to facilitate transactions between multiple issuers and multiple acquirers; for example, virtual private networks (VPNs) such as the BANKNET® telecommunications network of MasterCard International Incorporated, or the VISANET® network of Visa International Service Association.

Figure 9:
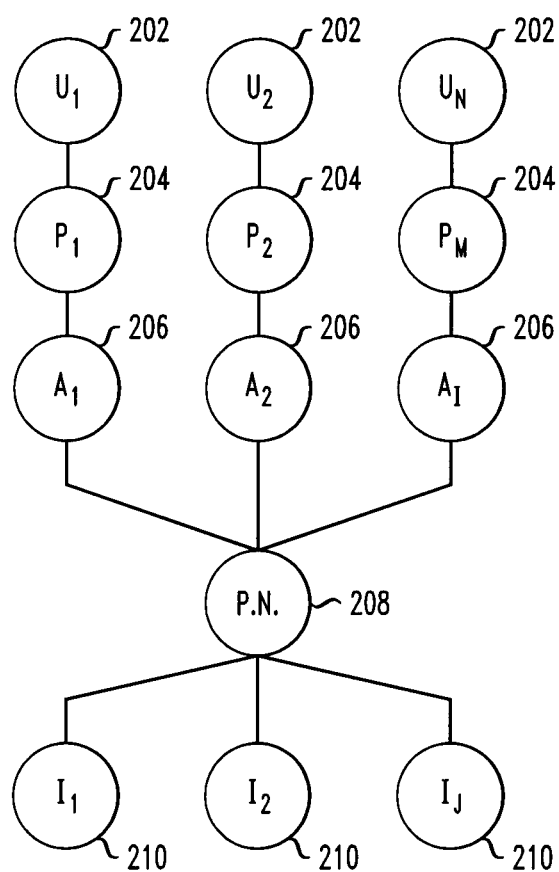
FIG. 9 depicts an exemplary inter-relationship between and among: (i) a payment network configured to facilitate transactions between multiple issuers and multiple acquirers, (ii) a plurality of users, (iii) a plurality of providers or other merchants, plurality of acquirers, and (v) a plurality of issuers.

With reference to FIG. 9, an exemplary relationship among multiple entities is depicted. A number of different users 202, $U_1, U_2 \ldots U_N$, interact with a number of different merchants 204, $P_1, P_2 \ldots P_M$. Users 202 could be, for example, holders of payment cards. Merchants 204 interact with a number of different acquirers 206, $A_1, A_2 \ldots A_I$. Acquirers 206 interact with a number of different issuers 210, $I_1, I_2 \ldots I_J$, through, for example, a single operator 208 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 202 pays for the purchase and the merchant 204 submits the transaction to the acquirer (acquiring bank) 206. The acquirer verifies the card number, the transaction type and the amount with the issuer 210 and reserves that amount of the cardholder's credit limit for the merchant. Authorized transactions are stored in "batches," which are sent to the acquirer 206. During clearing and settlement, the acquirer sends the batch transactions through the credit card association, which debits the issuers 210 for payment and credits the acquirer 206. Once the acquirer 206 has been paid, the acquirer 206 pays the merchant 204.

It will be appreciated that the network 208 shown in FIG. 9 is an example of a payment network configured to facilitate transactions between multiple issuers and multiple acquirers, which may be thought of as an "open" system.

Aspects of the invention, as noted, provide a single customer data file that contains data elements to populate both the ABU and Account Conversion databases. FIG. 7 presents an exemplary list of data elements for such a combined account conversion and ABU file. Note that 'Member ID/ICA' refers to a MasterCard Customer Identifying Number and is exemplary, in general terms, of a customer identifier such as an alphanumeric string or the like.

Figure 8:
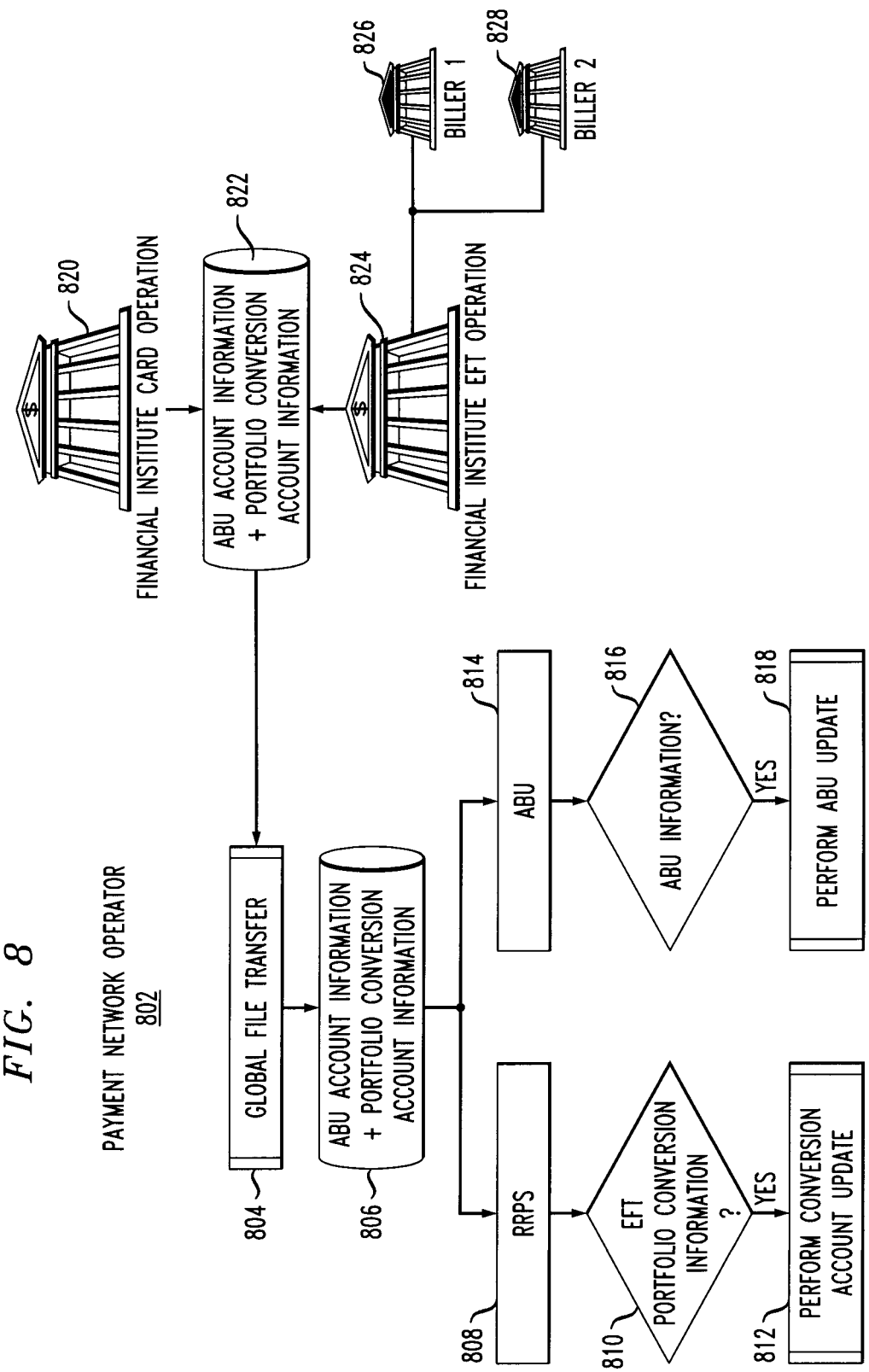
FIG. 8 shows a flow chart and block diagram for an exemplary method, according to another aspect of the invention.

With reference to FIG. 8, a plurality of billers 826, 828 provide account update information to a concentrator or consolidator (in general terms, an EFT operation 824 of a financial institution). The financial institution also has a card operation 820. At 822, the financial institution combines the information (e.g., RPPS type as in FIGS. 5A and 5B) from billers 826, 828, as well as the card operation information (e.g., ABU type as in FIGS. 3, 4A, and 4B), into a single file formatted with elements as shown in FIG. 7 and sends same to network operator 802; for example, using MasterCard GFT (global file transfer) or a similar file transfer system, as at block 804. Operator 802 then operates a system such as RPPS, at block 808, using the consolidated file 806 to determine, in decision block 810, whether EFT portfolio conversion information, or the like, requires a conversion account update in block 812. Furthermore, operator 802 also operates a system such as ABU, at block 814, using the consolidated file 806 to determine, in decision block 816, whether ABU information, or the like, requires an ABU update in block 818.

Given the discussion thus far, it will be appreciated that, in general terms, an exemplary method, according to an aspect of the invention, includes the step of receiving, at an electronic funds transfer bill payment operation 824 of a financial institution, first information representing an account restructuring of a biller 826 or 828 which uses the electronic funds transfer bill payment operation. This step could be carried out, for example, by an electronic funds transfer bill payment module executing on at least a first hardware processor. Software modules are discussed below. An additional step shown at 822 includes combining the first information with second information into a uniformly formatted file, an example of which is seen in FIG. 7. This step could be carried out, for example, by an inteuation module executing on the at least first hardware processor (there could be one or more hardware processors at the financial institution so these steps could be carried out by the same or different processors). The second information is formatted differently than the first information. The second information includes card update information (e.g., anew card account number or a new card expiration date) for recurring payment card payments made with payment cards issued by the financial institution, as per card operation 820. A further step 804 includes transferring the uniformly formatted file to an operator of a payment network 208, 608, 802 of a kind configured to facilitate transactions between multiple issuers 210 and multiple acquirers 206. This could also be done by the integration module.

FIGS. 3 and 4 are non-limiting examples of the second information. FIG. 5 is a non-limiting example of the first information.

Preferably, an additional optional step includes receiving, by the operator of the payment network, the uniformly formatted file, as seen at 806. The uniformly formatted file specifies at least one old account number associated with the biller 826 or 828 and at least one new account number associated with the biller 826 or 828. Another preferred but optional step includes operating a recurring payment transaction system for card-not-present recurring payments, by the operator of the payment network, in accordance with the uniformly formatted file, as shown at 814, 816, 818. This can be done by updating card information for the card-not-present recurring payments in accordance with the uniformly formatted file. Still another preferred but optional step includes operating an electronic funds transfer account conversion application, by the operator of the payment network, in accordance with the uniformly formatted file, as shown at 808, 810, 812. This can be done by routing payments in accordance with the uniformly formatted file.

These preferred but optional steps could be carried out, for example, by a payment network platform module executing on at least a second hardware processor. There could be one or more hardware processors at the payment network so these steps could be carried out by the same or different processors.

The routing of payment could be carried out as described above with respect to FIG. 1; for example, placing the at least one old account number and the at least one new account number associated with the biller in a conversion data structure in a format to facilitate account number conversion, as at step 122; obtaining payment data from a bill payment originator (the payment data includes an indication of the old account number of the biller) as at 128; and routing the payment data to the new account number of the biller in accordance with the conversion data structure, as at 126, 132, 134, 138, and 140.

The updating of the card information could be carried out as described with respect to FIG. 6 and in the aforesaid US Patent Publication 2009/0171839 of Rosano et al. In particular, the operator of the payment network 608, 208, 802 advises an acquirer 610, 206 of the card update information.

The first information could represent account restructuring of multiple billers 826, 828 which use the electronic funds transfer bill payment operation 824.

The uniformly formatted file could be stored in a data base or other data store at the financial institution and/or in a data base or other data store within the payment network. The conversion data structure could be stored in a data base or other data store within the payment network.

Furthermore, in general terms, an exemplary method, according to another aspect of the invention, includes the step of receiving, by an operator of a payment network of a kind configured to facilitate transactions between multiple issuers and multiple acquirers, from a financial institution, a uniformly formatted file, as seen at 806. The uniformly formatted file, as described above, specifies at least one old account number associated with a biller 826 or 828 and at least one new account number associated with the biller 826 or 828. The uniformly formatted file is of the kind prepared by the financial institution, as described above, by combining first information representing an account restructuring of the biller (the biller uses an electronic funds transfer bill payment operation 824 of the financial institution) and second information. The second information is formatted differently than the first information, and the second information includes card update information for recurring payment card payments made with payment cards issued by the financial institution (for example, its card operation 820). A further step includes operating a recurring payment transaction system for card-not-present recurring payments, by the operator of the payment network, in accordance with the uniformly formatted file, by updating card information for the card-not-present recurring payments in accordance with the uniformly formatted file, as per steps 814, 816, and 818. A still further step includes operating an electronic funds transfer account conversion application, by the operator of the payment network, in accordance with the uniformly formatted file, by routing payments in accordance with the uniformly formatted file, as at steps 808, 810, 812. The steps described with respect to this other aspect of the invention can be carried out using the modules and other elements as described above and elsewhere herein.

In still another aspect, an exemplary embodiment of an apparatus includes a first memory (e.g., like memory 230 described below) and at least a first processor (e.g., like processor 220 described below) coupled to the first memory. The at least first processor is operative to carry out method steps as just described with respect to the financial institution (e.g., 820, 822, 824, 804) Preferably, the apparatus further includes a payment network 208, 608, 802 of the kind configured to facilitate transactions between multiple issuers and multiple acquirers. The payment network is operated by the operator and is coupled to the at least first processor. Preferably, the apparatus further includes a second memory (e.g., like memory 230 described below) and at least a second processor (e.g., like processor 220 described below) coupled to the second memory and the payment network. The at least second processor is operative to receive the uniformly formatted file, such as via file transfer 804. The uniformly formatted file specifies at least one old account number associated with the biller and at least one new account number associated with the biller. The at least second processor is operative to operate a recurring payment transaction system for card-not-present recurring payments in accordance with the uniformly formatted file, by updating card information for the card-not-present recurring payments in accordance with the uniformly formatted file, as per steps 814, 816, 818; and to operate an electronic funds transfer account conversion application in accordance with the uniformly formatted file, by routing payments in accordance with the uniformly formatted file, as at steps 808, 810, 812.

The at least first processor can include, for example, one or more processors controlled by or operated for the financial institution (e.g., in a server farm, on a mainframe, etc.) and in the case of multiple processors, the processors can be collocated or diverse and networked, for example. The at least first processor can be operative to carry out and/or facilitate any or all of the steps described with respect to the financial institution. The at least second processor can include, for example, one or more processors controlled by or operated for the operator of the payment network (e.g., in a server farm, on a mainframe, etc.) and in the case of multiple processors, the processors can be collocated or diverse and networked, for example. The at least second processor can be operative to carry out and/or facilitate any or all of the steps described with respect to the payment network and its operator.

The processors may execute, for example, one or more distinct software modules or sub-modules as described below.

System and Article of Manufacture Details

The invention can employ hardware and/or hardware and software aspects. Software includes but is not limited to firmware, resident software, microcode, etc. Software might be employed, for example, in connection with one or more of the blocks in FIGS. 1, 6, 8, and 9. It is presently believed that aspects of the invention can be advantageously implemented, e.g., in software running on one or more general purpose computers. Software running on a computer can also be used for building the combined file as shown in FIG. 7, or implementing the data and logic flows on FIGS. 1, 6, 8, and 9. Thus, execution of one or more steps herein can be tied, for example, to one or more general purpose computers specifically programmed to implement the logic described herein, and/or a computer program product embodying instructions to implement such logic. Further, one or more steps herein may manipulate data representative of tangible items such as currency, physical credit cards or other payment cards, and the like.

Figure 2:
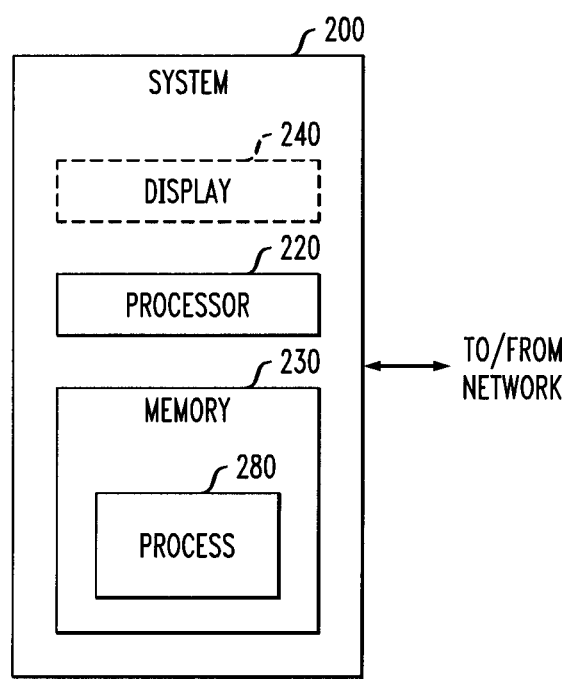
FIG. 2 is a block diagram of an exemplary computer system useful in one or more embodiments of the invention.

FIG. 2 is a block diagram of a system 200 that can implement part or all of one or more aspects or processes of the present invention. As shown in FIG. 2, memory 230 configures the processor 220 (which could correspond, e.g., to processors associated with any of the blocks in FIGS. 1, 6, 8, and 9) to implement one or more aspects of the methods, steps, and functions disclosed herein (collectively, shown as process 280 in FIG. 2). Different method steps can be performed by different processors. The memory 230 could be distributed or local and the processor 220 could be distributed or singular. The memory 230 could be implemented as an electrical, magnetic or optical memory, or any combination of these or other types of storage devices. It should be noted that if distributed processors are employed, each distributed processor that makes up processor 220 generally contains its own addressable memory space. It should also be noted that some or all of computer system 200 can be incorporated into an application-specific or general-use integrated circuit. For example, one or more method steps could be implemented in hardware in an ASIC rather than using firmware. Display 240 is representative of a variety of possible input/output devices (e.g., displays, mice, keyboards, and so on).

The "means" for performing the various functions and/or steps set forth herein can include, for example, hardware modules including circuitry such as ASICs, software modules running on one or more hardware processors, or combinations thereof (for example, hardware and software could be used in combination to perform a given function, or to perform different functions within the same apparatus). In one or more embodiments, techniques of the invention can be implemented using software running on one or more general purpose computers, connected, for example, in a client-server configuration over the Internet (other networks, such as virtual private networks, could also be used). Thus, in some cases, the means include one or more processors in a server or other general purpose computer or the like programmed to implement the logic described herein.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein. An apparatus (for example, for developing combined files as described herein) could include a memory, and at least one processor coupled to the memory operative to perform one or more method steps set forth herein, or otherwise facilitate their performance.

Accordingly, it will be appreciated that one or more embodiments of the present invention can include a computer program comprising computer program code means adapted to perform one or all of the steps of any methods or claims set forth herein when such program is run on a computer, and that such program may be embodied on a tangible computer readable storage medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 200 as shown in FIG. 2) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include an electronic funds transfer bill payment module at location 824, an integration module at location 822, and a payment network platform module at locations 208, 608, 802. The method steps can then be carried out using the distinct software modules of the system, as described above, executing on the one or more hardware processors. There may be additional sub-modules; for example the integration module might include a sub-module to carry out or interface with card operation 820 and another sub-module to carry out the actual file combination. In addition, the payment network platform module might have a recurring payment transaction system sub-module and an electronic funds transfer account conversion application sub module; the latter could have, for example, a data-file obtaining sub-module, a conversion data structure placement sub-module, a remittance data obtaining sub-module, and a remittance data routing sub-module. Further, a computer program product can include a tangible computer-readable recordable storage medium (inclusive of multiple such media) with code adapted to be executed to carry out one or more method steps described herein, including the provision of the system with the distinct software modules.

Computers discussed herein can be interconnected, for example, by one or more of a payment network operating according to a payment system standard and/or specification; another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C. C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic depicted herein, such as the logic described with regard to FIGS. 1, 6, and 8; the computers can also include data structures such as shown in FIGS. 3-7.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
receiving, at an electronic funds transfer bill payment operation of a financial institution, first information representing an account restructuring of a biller converting identification information of an account, wherein said biller uses said electronic funds transfer bill payment operation;
combining, by said financial institution, said first information with second information into a uniformly formatted file, said second information being formatted differently than said first information, said second information comprising card update information for recurring payment card payments, wherein said recurring payment card payments are made with payment cards issued by said financial institution;
transferring, by said financial institution, said uniformly formatted file to a configured/electronic operator of a payment network of a kind configured to facilitate transactions between multiple issuers, including said financial institution, and multiple acquirers; and
providing a system, wherein the system comprises distinct software modules, each of the distinct software modules being embodied on at least one tangible computer readable recordable storage medium, and wherein the distinct software modules comprise an electronic funds transfer bill payment module and an integration module;
wherein:
said receiving of said first information is carried out by said electronic funds transfer bill payment module executing on at least a first hardware processor;
said combining of said first information with said second information is carried out by said integration module executing on said at least first hardware processor; and
said transferring of said uniformly formatted file is carried out by said integration module executing on said at least first hardware processor.

2. The method of claim 1, further comprising the additional steps of:
receiving, by said operator of said payment network, said uniformly formatted file, said uniformly formatted file specifying at least one old account number associated with said biller and at least one new account number associated with said biller;
operating a recurring payment transaction system for card-not-present recurring payments, by said operator of said payment network, in accordance with said uniformly formatted file, by updating card information for said card-not-present recurring payments in accordance with said uniformly formatted file; and
operating an electronic funds transfer account conversion application, by said operator of said payment network, in accordance with said uniformly formatted file, by routing at least one payment to said biller in accordance with said uniformly formatted file.

3. The method of claim 2, wherein the distinct software modules further comprise a payment network platform module;
wherein:
said receiving of said uniformly formatted file is carried out by said payment network platform module executing on at least a second hardware processor;
said operating of said recurring payment transaction system is carried out by said payment network platform module executing on said at least second hardware processor; and
said operating of said electronic funds transfer account conversion application is carried out by said payment network platform module executing on said at least second hardware processor.

4. The method of claim 2, wherein said routing of said payments comprises:
placing said at least one old account number and said at least one new account number associated with said biller in a conversion data structure in a format to facilitate account number conversion;
obtaining payment data from a bill payment originator, said payment data comprising an indication of said old account number of said biller; and
routing said payment data to said new account number of said biller in accordance with said conversion data structure.

5. The method of claim 4, wherein said updating of said card information comprises said operator of said payment network advising an acquirer of said card update information.

6. The method of claim 1, wherein said biller is a first biller and wherein, in said receiving step, said first information further represents an account restructuring of a second biller converting identification information of a second account, wherein the second biller uses said electronic funds transfer bill payment operation.

7. The method of claim 1, wherein, in said combining step, said card update information comprises at least one of a new card account number and a new card expiration date.

8. A method comprising the steps of:
receiving, by a configured/electronic operator of a payment network of a kind configured to facilitate transactions between multiple issuers, including a financial institution, and multiple acquirers, a uniformly formatted file from said financial institution, said uniformly formatted file specifying at least one old account number associated with a biller and at least one new account number associated with said biller, said uniformly formatted file having been prepared by said financial institution by combining:
first information representing an account restructuring of said biller converting identification information of an account, said biller using an electronic funds transfer bill payment operation of said financial institution; and
second information, said second information being formatted differently than said first information, said second information comprising card update information for recurring payment card payments, wherein said recurring payment card payments are made with payment cards issued by said financial institution;
operating a recurring payment transaction system for card-not-present recurring payments, by said operator of said payment network, in accordance with said uniformly formatted file, by updating card information for said card-not-present recurring payments in accordance with said uniformly formatted file;

operating an electronic funds transfer account conversion application, by said operator of said payment network, in accordance with said uniformly formatted file, by routing at last one payment to said biller in accordance with said uniformly formatted file;

providing a system, wherein the system comprises at least one distinct software module embodied on a tangible computer readable recordable storage medium, and wherein the distinct software module comprise an a payment network platform module;

wherein:

said receiving of said uniformly formatted file is carried out by said payment network platform module executing on at least a first hardware processor;

said operating of said recurring payment transaction system is carried out by said payment network platform module executing on said at least first hardware processor; and said operating of said electronic funds transfer account conversion application is carried out by said payment network platform module executing on said at least first hardware processor.

9. The method of claim 8, wherein said routing of said payments comprises:

placing said at least one old account number and said at least one new account number associated with said biller in a conversion data structure in a format to facilitate account number conversion;

obtaining payment data from a bill payment originator, said payment data comprising an indication of said old account number of said biller; and routing said payment data to said new account number of said biller in accordance with said conversion data structure.

10. The method of claim 9, wherein said updating of said card information comprises said operator of said payment network advising an acquirer of said card update information.

11. An apparatus comprising:

a first memory; and at least a first processor coupled to said first memory, said at least first processor being operative to:

receive, at an electronic funds transfer bill payment operation of a financial institution, first information representing an account restructuring of a biller converting identification information of an account, wherein said biller uses said electronic funds transfer bill payment operation;

combine, by said financial institution, said first information with second information into a uniformly formatted file, said second information being formatted differently than said first information, said second information comprising card update information for recurring payment card payments, wherein said recurring payment card payments are made with payment cards issued by said financial institution; and facilitate transferring, by said financial institution, said uniformly formatted file to a configured/electronic operator of a payment network of a kind configured to facilitate transactions between multiple issuers, including said financial institution, and multiple acquirers.

12. The apparatus of claim 11, further comprising:

a payment network of said kind configured to facilitate transactions between multiple issuers and multiple acquirers, said payment network being operated by said operator and being coupled to said at least first processor;

a second memory;

at least a second processor coupled to said second memory and said payment network, said at least second processor being operative to:

receive said uniformly formatted file, said uniformly formatted file specifying at least one old account number associated with said biller and at least one new account number associated with said biller;

operate a recurring payment transaction system for card-not-present recurring payments in accordance with said uniformly formatted file, by updating card information for said card-not-present recurring payments in accordance with said uniformly formatted file; and operate an electronic funds transfer account conversion application in accordance with said uniformly formatted file, by routing at least one payment to said biller in accordance with said uniformly formatted file.

13. The apparatus of claim 12, further comprising at least one tangible computer readable recordable storage medium embodying distinct software modules, said distinct software modules comprising an electronic funds transfer bill payment module, an integration module, and a payment network platform module;

wherein:

said at least first processor is operative to receive said first information by executing said electronic funds transfer bill payment module;

said at least first processor is operative to combine said first information with said second information by executing said integration module;

said at least first processor is operative to facilitate transferring said uniformly formatted file by executing said integration module;

said at least second processor is operative to receive said uniformly formatted file by executing said payment network platform module;

said at least second processor is operative to operate said recurring payment transaction system by executing said payment network platform module; and said at least second processor is operative to operate said electronic funds transfer account conversion application by executing said payment network platform module.

14. The apparatus of claim 12, wherein said at least second processor is operative to route said payments by:

placing said at least one old account number and said at least one new account number associated with said biller in a conversion data structure in a format to facilitate account number conversion;

obtaining payment data from a bill payment originator, said payment data comprising an indication of said old account number of said biller; and routing said payment data to said new account number of said biller in accordance with said conversion data structure.

15. The apparatus of claim 14, wherein said at least second processor is operative to update said card information by advising an acquirer of said card update information.

16. The apparatus of claim 11, wherein said biller is a first biller and wherein said first information further represents an account restructuring of a second biller converting identification information of a second account, wherein the second biller uses said electronic funds transfer bill payment operation.

17. The apparatus of claim 11, wherein said card update information comprises at least one of a new card account number and a new card expiration date.

18. A computer program product comprising at least one non-transitory tangible computer readable recordable storage medium including computer usable program code, said computer program product including:

computer usable program code for receiving, at an electronic funds transfer bill payment operation of a financial institution, first information representing an account restructuring of a biller converting identification information of an account, wherein said biller uses said electronic funds transfer bill payment operation;

computer usable program code for combining, by said financial institution, said first information with second information into a uniformly formatted file, said second information being formatted differently than said first information, said second information comprising card update information for recurring payment card payments, wherein said recurring payment card payments are made with payment cards issued by said financial institution; and computer usable program code for transferring, by said financial institution, said uniformly formatted file to a configured/electronic operator of a payment network of a kind configured to facilitate transactions between multiple issuers, including said financial institution, and multiple acquirers.

19. The computer program product of claim 18, further comprising:

computer usable program code for receiving, by said operator of said payment network, said uniformly formatted file, said uniformly formatted file specifying at least one old account number associated with said biller and at least one new account number associated with said biller;

computer usable program code for operating a recurring payment transaction system for card-not-present recurring payments, by said operator of said payment network, in accordance with said uniformly formatted file, by updating card information for said card-not-present recurring payments in accordance with said uniformly formatted file; and computer usable program code for operating an electronic funds transfer account conversion application, by said operator of said payment network, in accordance with said uniformly formatted file, by routing at least one payment to said biller in accordance with said uniformly formatted file.

20. The computer program product of claim 19, wherein said computer usable program code for routing of said payments comprises:

computer usable program code for placing said at least one old account number and said at least one new account number associated with said biller in a conversion data structure in a format to facilitate account number conversion;

computer usable program code for obtaining payment data from a bill payment originator, said payment data comprising an indication of said old account number of said biller; and computer usable program code for routing said payment data to said new account number of said biller in accordance with said conversion data structure.

21. The computer program product of claim 20, wherein said computer usable program code for updating of said card information comprises computer usable program code for facilitating said operator of said payment network advising an acquirer of said card update information.

22. The computer program product of claim 18, wherein, in said computer usable program code for combining, said card update information comprises at least one of a new card account number and a new card expiration date.

23. An apparatus comprising:

means for receiving, at an electronic funds transfer bill payment operation of a financial institution, first information representing an account restructuring of a biller converting identification information of an account, wherein said biller uses said electronic funds transfer bill payment operation;

means for combining, by said financial institution, said first information with second information into a uniformly formatted file, said second information being formatted differently than said first information, said second information comprising card update information for recurring payment card payments, wherein said recurring payment card payments are made with payment cards issued by said financial institution; and means for transferring, by said financial institution, said uniformly formatted file to a configured/electronic operator of a payment network of a kind configured to facilitate transactions between multiple issuers, including said financial institution, and multiple acquirers;

wherein said apparatus excludes a transmission medium and disembodied signal.

24. The apparatus of claim 23, further comprising:

means for receiving, by said operator of said payment network, said uniformly formatted file, said uniformly formatted file specifying at least one old account number associated with said biller and at least one new account number associated with said biller;

means for operating a recurring payment transaction system for card-not-present recurring payments, by said operator of said payment network, in accordance with said uniformly formatted file, by updating card information for said card-not-present recurring payments in accordance with said uniformly formatted file; and means for operating an electronic funds transfer account conversion application, by said operator of said payment network, in accordance with said uniformly formatted file, by routing at least one payment to said biller in accordance with said uniformly formatted file.

* * * * *